(12) United States Patent
Yamazaki

(10) Patent No.: US 12,304,137 B2
(45) Date of Patent: May 20, 2025

(54) THREE-DIMENSIONAL SHAPED ARTICLE MANUFACTURING METHOD AND DATA PROCESSING DEVICE

(71) Applicant: SEIKO EPSON CORPORATION, Tokyo (JP)

(72) Inventor: Satoshi Yamazaki, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 446 days.

(21) Appl. No.: 17/069,902

(22) Filed: Oct. 14, 2020

(65) Prior Publication Data

US 2021/0114306 A1 Apr. 22, 2021

(30) Foreign Application Priority Data

Oct. 16, 2019 (JP) .................................. 2019-189131

(51) Int. Cl.
*B29C 64/118* (2017.01)
*B22F 10/00* (2021.01)
(Continued)

(52) U.S. Cl.
CPC ............ *B29C 64/118* (2017.08); *B22F 10/00* (2021.01); *B28B 1/001* (2013.01); *B29C 64/165* (2017.08);
(Continued)

(58) Field of Classification Search
CPC ... B29C 64/393; B29C 64/118; B29C 64/205; B29C 64/209; B29C 64/386;
(Continued)

(56) References Cited

U.S. PATENT DOCUMENTS 6,814,907 B1 * 11/2004 Comb ..................... B29C 41/52
264/308
2008/0248193 A1 * 10/2008 Nakatsuji ............ B05C 11/1002
427/407.1
(Continued)

FOREIGN PATENT DOCUMENTS

EP          3584064 A1     12/2019
JP        2018-108729 A     7/2018
(Continued)

*Primary Examiner* — Seyed Masoud Malekzadeh
*Assistant Examiner* — Jennifer L Groux
(74) *Attorney, Agent, or Firm* — Global IP Counselors, LLP

(57) ABSTRACT

A three-dimensional shaped article manufacturing method by using a flow rate adjustment mechanism to control a discharge start and a discharge stop of a shaping material discharged from a discharge unit and stacking the shaping material includes generating intermediate data including a partial route that is a route along which the discharge unit moves while continuously discharging the shaping material, and a moving speed of the discharge unit on the partial route, generating shaping data based on the intermediate data, and controlling the discharge unit according to the shaping data and shaping the three-dimensional shaped article. The moving speed is changed such that a control time required to control the flow rate adjustment mechanism on the partial route is equal to or shorter than a moving time for the discharge unit to move along the partial route when the control time is longer than the moving time.

9 Claims, 10 Drawing Sheets

(51) Int. Cl.
  *B28B 1/00* (2006.01)
  *B29C 64/165* (2017.01)
  *B29C 64/209* (2017.01)
  *B29C 64/393* (2017.01)
  *B33Y 10/00* (2015.01)
  *B33Y 50/02* (2015.01)
  *B22F 1/10* (2022.01)
  *B29K 55/02* (2006.01)

(52) U.S. Cl.
  CPC .......... *B29C 64/209* (2017.08); *B29C 64/393* (2017.08); *B33Y 10/00* (2014.12); *B33Y 50/02* (2014.12); *B22F 1/10* (2022.01); *B29K 2055/02* (2013.01)

(58) Field of Classification Search
  CPC ... B29C 64/106; B29C 64/112; B29C 64/343; B33Y 50/02; B33Y 10/00; B33Y 30/00; B33Y 50/00; B05C 5/0225; B05C 5/0233; B05C 11/1015; B05C 11/1023
  See application file for complete search history.

(56) References Cited

U.S. PATENT DOCUMENTS

| | | | |
|---|---|---|---|
| 2014/0291886 A1* | 10/2014 | Mark | B33Y 40/00 264/259 |
| 2016/0075089 A1* | 3/2016 | Duro Royo | B29C 64/118 425/166 |
| 2016/0263822 A1* | 9/2016 | Boyd, IV | B29D 99/0017 |
| 2017/0050381 A1* | 2/2017 | Minardi | B29C 64/393 |
| 2017/0151704 A1* | 6/2017 | Go | B29C 48/266 |
| 2018/0085777 A1* | 3/2018 | Sakai | B05C 11/1034 |
| 2018/0106428 A1* | 4/2018 | Reuter | F16K 31/046 |
| 2018/0186091 A1 | 7/2018 | Wu et al. | |
| 2018/0297288 A1* | 10/2018 | Barbati | B29C 64/118 |
| 2019/0061243 A1 | 2/2019 | Saito et al. | |
| 2020/0282593 A1* | 9/2020 | Le Roux | E04G 21/04 |

FOREIGN PATENT DOCUMENTS

| | | |
|---|---|---|
| JP | 2018-167565 A | 11/2018 |
| JP | 2019-081263 A | 5/2019 |

* cited by examiner

THREE-DIMENSIONAL SHAPED ARTICLE MANUFACTURING METHOD AND DATA PROCESSING DEVICE

The present application is based on, and claims priority from JP Application Serial Number 2019-189131, filed Oct. 16, 2019, the disclosure of which is hereby incorporated by reference herein in its entirety.

BACKGROUND

1. Technical Field

The present disclosure relates to a three-dimensional shaped article manufacturing method and a data processing device.

2. Related Art

Regarding a three-dimensional shaped article manufacturing method, for example, JP-A-2019-81263 discloses a technique for controlling, by a flow rate adjustment mechanism including a butterfly valve, a discharge amount of a shaping material discharged from a nozzle.

In the technique described in JP-A-2019-81263, in the case of controlling a discharge start and a discharge stop by using the flow rate adjustment mechanism, depending on a moving speed of the nozzle and a length of a moving route of the nozzle, there is a possibility that the control of the flow rate adjustment mechanism does not catch up with an operation of the nozzle during shaping, and accurate shaping cannot be performed.

SUMMARY

According to one aspect of the present disclosure, a three-dimensional shaped article manufacturing method is provided. The three-dimensional shaped article manufacturing method is a three-dimensional shaped article manufacturing method for manufacturing a three-dimensional shaped article by using a flow rate adjustment mechanism to control a discharge start and a discharge stop of a shaping material discharged from a discharge unit and stacking the shaping material, and includes: a first step of generating intermediate data including a partial route that is a route along which the discharge unit moves while continuously discharging the shaping material, and a moving speed of the discharge unit on the partial route; a second step of generating shaping data based on the intermediate data after the moving speed is changed to make a control time required to control the flow rate adjustment mechanism on a partial route equal to or shorter than a moving time for the discharge unit to move along the partial route when the control time is longer than the moving time; and a third step of controlling the discharge unit according to the shaping data and shaping the three-dimensional shaped article.

DESCRIPTION OF EXEMPLARY EMBODIMENTS

A. First Embodiment

Figure 1:
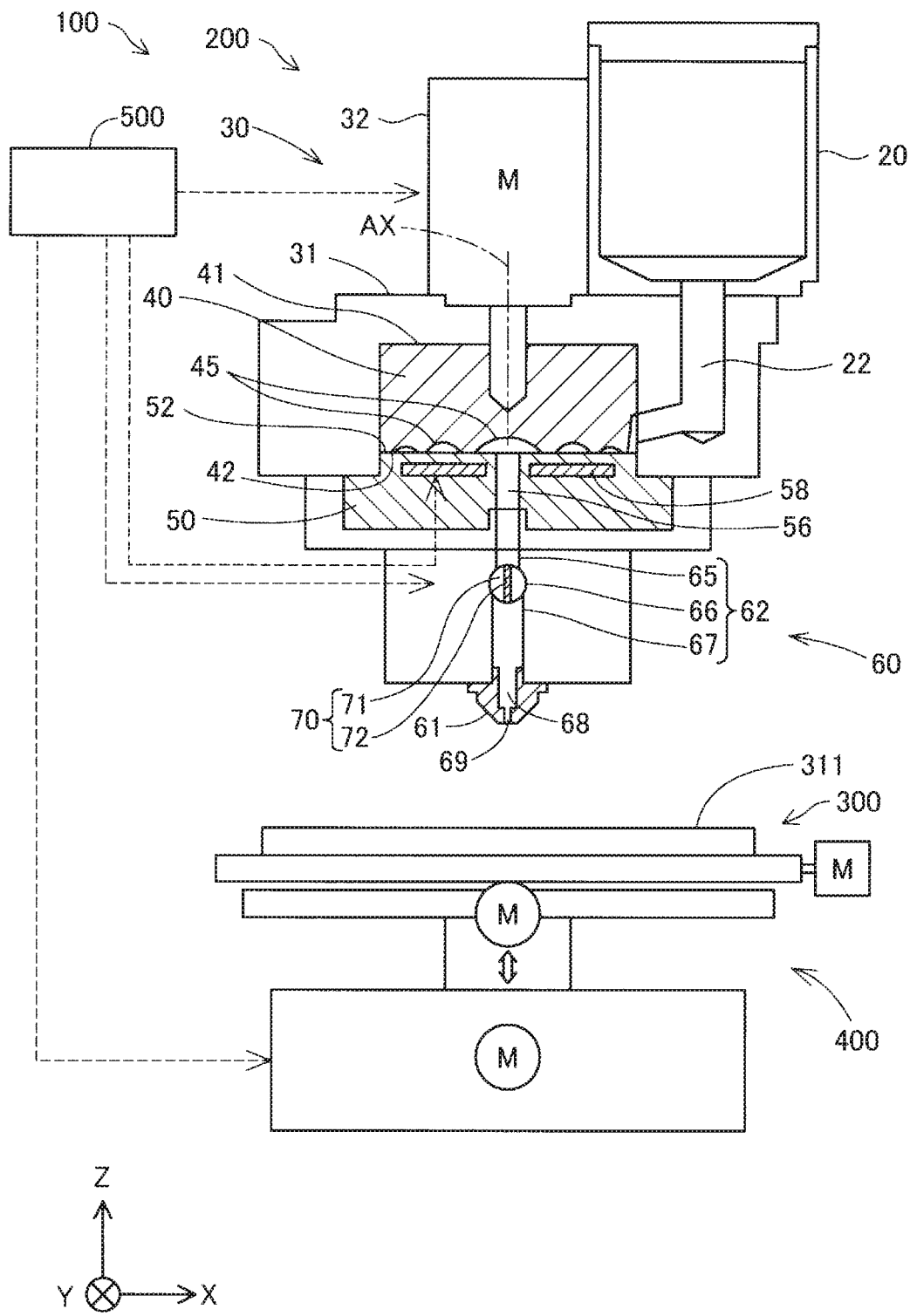
FIG. 1 is an explanatory diagram showing a schematic configuration of a three-dimensional shaping device according to a first embodiment.

FIG. 1 is an explanatory diagram showing a schematic configuration of a three-dimensional shaping device 100 according to a first embodiment. In FIG. 1, arrows along X, Y and Z directions orthogonal to each other are shown. The X direction and the Y direction are directions along a horizontal direction, and the Z direction is a direction along a vertical direction. In other figures, arrows along the X, Y and Z directions are also shown appropriately. The X, Y and Z directions in FIG. 1 and the X, Y and Z directions in other figures indicate the same directions, respectively.

The three-dimensional shaping device 100 according to the present embodiment includes a shaping unit 200, a stage 300, a moving mechanism 400, and a control unit 500. The three-dimensional shaping device 100 shapes a three-dimensional shaped article having a desired shape on a shaping surface 311 of the stage 300 by, under control of the control unit 500, discharging a shaping material from a discharge unit 60 provided on the shaping unit 200 towards the stage 300 while driving the moving mechanism 400 to change a relative position between the discharge unit 60 and the stage 300. The shaping material may be referred to as a molten material. A detailed configuration of the shaping unit 200 will be described later.

The moving mechanism 400 changes a relative position between the discharge unit 60 and the shaping surface 311. In the present embodiment, the moving mechanism 400 changes the relative position between the discharge unit 60 and the shaping surface 311 by moving the stage 300 relative to the shaping unit 200. The change in the relative position of the discharge unit 60 relative to the shaping surface 311 may be referred to as a movement of the discharge unit 60. In the present embodiment, for example, moving the stage 300 in a +X direction can also be rephrased as moving the discharge unit 60 in a −X direction.

The moving mechanism 400 according to the present embodiment is implemented by a three-axis positioner that moves the stage 300 in three axial directions, which are the X, Y and Z directions, by driving force of three motors. Each motor is driven under the control of the control unit 500. The moving mechanism 400 may be configured to change the relative position between the discharge unit 60 and the shaping surface 311 by moving the shaping unit 200 without moving the stage 300 instead of moving the stage 300. The moving mechanism 400 may be configured to change the relative position between the discharge unit 60 and the shaping surface 311 by moving both the stage 300 and the shaping unit 200.

The control unit 500 is implemented by a computer including one or more processors, a main storage device, and an input/output interface for inputting and outputting signals from and to an outside. In the present embodiment, the control unit 500 controls operations of the shaping unit 200 and the moving mechanism 400 by the processor executing a program or an instruction read from the main storage device, thereby executing shaping processing for shaping the three-dimensional shaped article. The operations include changing a three-dimensional relative position between the shaping unit 200 and the stage 300. The control unit 500 may be implemented by a combination of a plurality of circuits instead of the computer. As will be described later, the control unit 500 also functions as a data processing device that processes data for shaping the three-dimensional shaped article. In other embodiments, a data processing device separate from the control unit 500 may be provided.

The shaping unit 200 includes a material supply unit 20 as a material supply source, a melting unit 30 for melting a material supplied from the material supply unit 20 into the shaping material, the discharge unit 60 having a nozzle hole 69 for discharging the shaping material supplied from the melting unit 30, and a discharge amount adjustment mechanism 70 for adjusting a flow rate of the shaping material discharged from the nozzle hole 69.

The material supply unit 20 accommodates a material in a state of pellets, powder, or the like. In the present embodiment, a resin formed in a pellet shape is used as the material. The material supply unit 20 according to the present embodiment is implemented by a hopper. A supply path 22 that couples the material supply unit 20 and the melting unit 30 is provided below the material supply unit 20. The material supply unit 20 supplies the material to the melting unit 30 via the supply path 22. Details of the material will be described later.

The melting unit 30 includes a screw case 31, a drive motor 32, a flat screw 40, and a barrel 50. The melting unit 30 melts at least a part of the material in a solid state supplied from the material supply unit 20 into a fluid paste-shaped shaping material and supplies the melted material to the discharge unit 60. The term "melt" means not only that a thermoplastic material is heated to a temperature equal to or higher than a melting point to be a liquid, but also means "plasticization", that is, a thermoplastic material is softened by being heated to a temperature equal to or higher than a glass transition point to exhibit fluidity.

The screw case 31 is a housing for accommodating the flat screw 40. The barrel 50 is fixed to a lower surface of the screw case 31, and the flat screw 40 is accommodated in a space surrounded by the screw case 31 and the barrel 50. The drive motor 32 is fixed to an upper surface of the screw case 31. A rotation axis of the drive motor 32 is coupled to an upper surface 41 side of the flat screw 40. The drive motor 32 is driven under the control of the control unit 500.

The flat screw 40 has a substantially cylindrical shape whose height in a direction along a central axis RX is smaller than a diameter thereof. The flat screw 40 is disposed in the screw case 31 in a manner that the central axis RX is parallel to the Z direction. The flat screw 40 rotates around the central axis RX in the screw case 31 due to a torque generated by the drive motor 32. The flat screw 40 has a groove forming surface 42 in which groove portions 45 are formed on a side opposite to the upper surface 41 in the direction along the central axis RX. A specific configuration of the flat screw 40 on a groove forming surface 42 side will be described later.

The barrel 50 is disposed below the flat screw 40. The barrel 50 has a screw facing surface 52 that faces the groove forming surface 42 of the flat screw 40. A communication hole 56 that communicates with the discharge unit 60 is provided on the central axis RX of the flat screw 40 in the barrel 50. A heater 58 is built in the barrel 50 at a position facing the groove portions 45 of the flat screw 40. A temperature of the heater 58 is controlled by the control unit 500. A specific configuration of the barrel 50 on a screw facing surface 52 side will be described later.

The discharge unit 60 is fixed to a lower surface of the barrel 50. The discharge unit 60 includes a supply flow path 62 and a nozzle 61. The supply flow path 62 communicates with the melting unit 30 and the nozzle 61, and supplies the shaping material from the melting unit 30 to the nozzle 61.

The supply flow path 62 includes a first supply port 65, an intersection hole 66, and a second supply port 67. The first supply port 65 and the second supply port 67 extend in the vertical direction. The intersection hole 66 extends in the horizontal direction intersecting the first supply port 65 and the second supply port 67. An upper end of the first supply port 65 is coupled to the communication hole 56 of the barrel 50, and a lower end of the first supply port 65 is coupled to the intersection hole 66. An upper end of the second supply port 67 is coupled to the intersection hole 66, and a lower end of the second supply port 67 is coupled to the nozzle 61. The discharge amount adjustment mechanism 70, which will be described later, is accommodated in the intersection hole 66. The shaping material supplied from the communication hole 56 of the barrel 50 to the first supply port 65 flows in an order of the intersection hole 66, the second supply port 67, and the nozzle 61.

The nozzle 61 is provided with a nozzle flow path 68 and the nozzle hole 69. The nozzle flow path 68 is a flow path provided in the nozzle 61. The nozzle flow path 68 is coupled to the second supply port 67. The nozzle hole 69 is a part provided at an end portion of the nozzle flow path 68 on a side communicating with the atmosphere having a reduced flow path cross section. The shaping material supplied from the second supply port 67 to the nozzle flow path 68 is discharged from the nozzle hole 69. In the present embodiment, an opening shape of the nozzle hole 69 is circular. The opening shape of the nozzle hole 69 is not limited to circular, and may be, for example, a quadrangle or a polygon other than the quadrangle.

The discharge amount adjustment mechanism 70 is provided in the supply flow path 62, and adjusts an amount of the shaping material discharged from the nozzle 61. The amount of the shaping material discharged from the nozzle 61 per unit time may be referred to as a discharge amount. The discharge amount adjustment mechanism 70 according to the present embodiment is implemented by a butterfly valve. The discharge amount adjustment mechanism 70 includes a drive shaft 71, which is a shaft-shaped member, and a plate-shaped valve body 72 that rotates in accordance with a rotation of the drive shaft 71. The drive shaft 71 is inserted into the intersection hole 66 in a manner that the direction along a central axis of the drive shaft 71 intersects a direction in which the shaping material flows in the supply flow path 62.

The discharge amount adjustment mechanism 70 functions as a flow rate adjustment mechanism for adjusting the flow rate of the shaping material flowing in the supply flow path 62. Specifically, the discharge amount adjustment mechanism 70 adjusts the flow rate of the shaping material flowing in the supply flow path 62 by changing a rotation angle of the valve body 72. The discharge amount is adjusted by adjusting the flow rate of the shaping material flowing in the supply flow path 62. Increasing the discharge amount by controlling the discharge amount adjustment mechanism 70 may be referred to as opening the discharge amount adjustment mechanism 70. Decreasing the discharge amount by controlling the discharge amount adjustment mechanism 70 may be referred to as closing the discharge amount adjustment mechanism 70. The rotation degree of the valve body 72 may be referred to as an opening degree. When, due to the rotation of the drive shaft 71, a plate-shaped surface of the valve body 72 is perpendicular to the direction in which the shaping material flows in the supply flow path 62, the opening degree is 0, the melting unit 30 and the nozzle 61 do not communicate with each other, and a discharge of the shaping material from the nozzle 61 is stopped. When the plate-shaped surface of the valve body 72 is parallel to the direction in which the shaping material flows in the supply flow path 62, the opening degree is 100, the melting unit 30 and the nozzle 61 communicate with each other, and the shaping material is discharged. In this way, the discharge amount adjustment mechanism 70 controls both a discharge start and a discharge stop of the shaping material from the nozzle 61.

Figure 2:
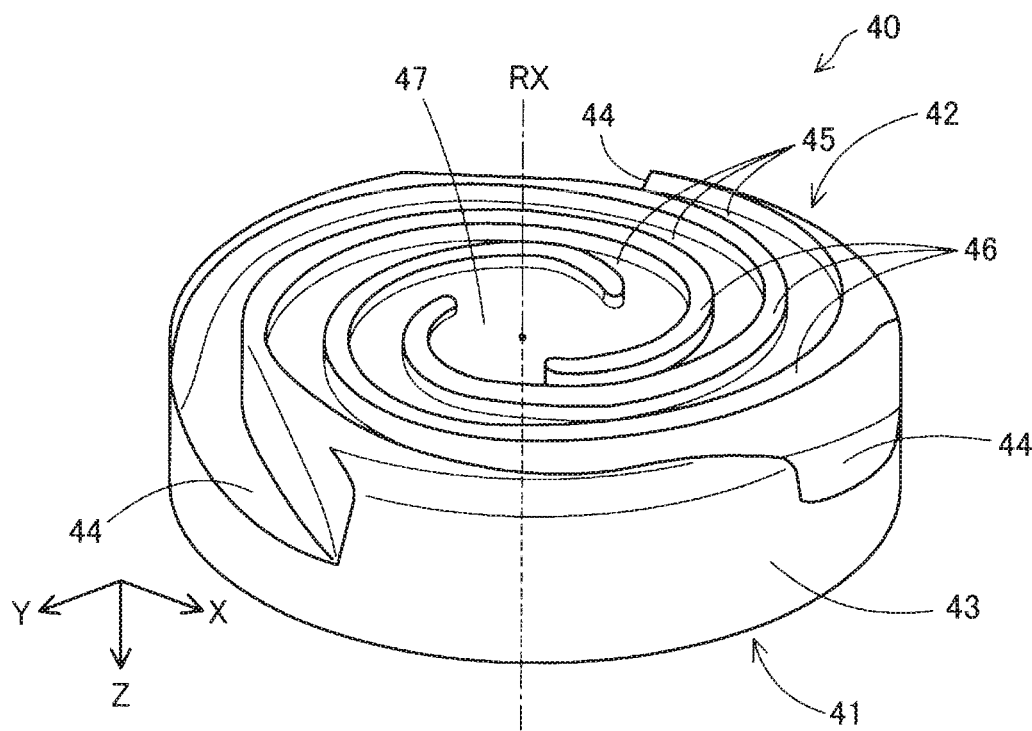
FIG. 2 is a schematic perspective view showing a configuration of a flat screw on a groove forming surface side.

FIG. 2 is a schematic perspective view showing a configuration of the flat screw 40 one the groove forming surface 42 side. In FIG. 2, the position of the central axis RX of the flat screw 40 is indicated by a one dot chain line. The groove portions 45 are provided in the groove forming surface 42 as described with reference to FIG. 1.

A central portion 47 of the groove forming surface 42 of the flat screw 40 is configured as a recess to which one end of each groove portion 45 is coupled. The central portion 47 faces the communication hole 56 of the barrel 50 shown in FIG. 1. The central portion 47 intersects the central axis RX.

The groove portion 45 of the flat screw 40 forms a so-called scroll groove. The groove portion 45 extends in a vortex shape from the central portion 47 in a manner of drawing an arc toward an outer periphery of the flat screw 40. The groove portion 45 may be configured to extend in a spiral shape. The groove forming surface 42 is provided with ridge portions 46 that constitute side wall portions of the groove portions 45 and extend along the groove portions 45.

The groove portion 45 is continuous to a material introduction port 44 formed in a side surface 43 of the flat screw 40. The material introduction port 49 is a part for receiving the material supplied via the supply path 22 of the material supply unit 20.

FIG. 2 shows an example of the flat screw 40 having three groove portions 45 and three ridge portions 46. The number of the groove portion 45 and the ridge portion 46 provided in the flat screw 40 is not limited to three. Only one groove portion 45 may be provided in the flat screw 40, or two or more groove portions 45 may be provided. Any number of the ridge portion 46 may be provided in accordance with the number of the groove portion 45.

FIG. 2 shows an example of the flat screw 40 in which the material introduction port 44 is formed at three locations. The number of the material introduction port 44 provided in the flat screw 40 is not limited to three. In the flat screw 40, the material introduction port 44 may be provided at only one location, or may be provided at two or more locations.

Figure 3:
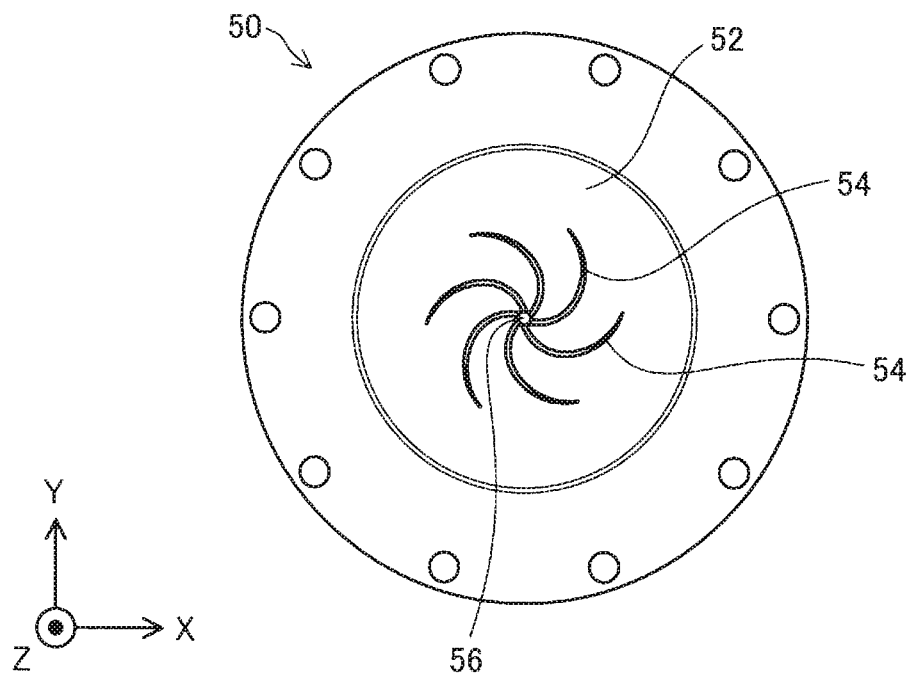
FIG. 3 is a top view showing a configuration of a barrel on a screw facing surface side.

FIG. 3 is a top view showing a configuration of the barrel 50 on the screw facing surface 52 side. As described above, the communication hole 56 communicating with the discharge unit 60 is formed at a center of the screw facing surface 52. A plurality of guide grooves 54 are formed around the communication hole 56 in the screw facing surface 52. Each guide groove 54 has one end coupled to the communication hole 56, and extends in a vortex shape from the communication hole 56 toward an outer periphery of the screw facing surface 52. The guide grooves 54 have a function of guiding the shaping material to the communication hole 56.

Figure 4:
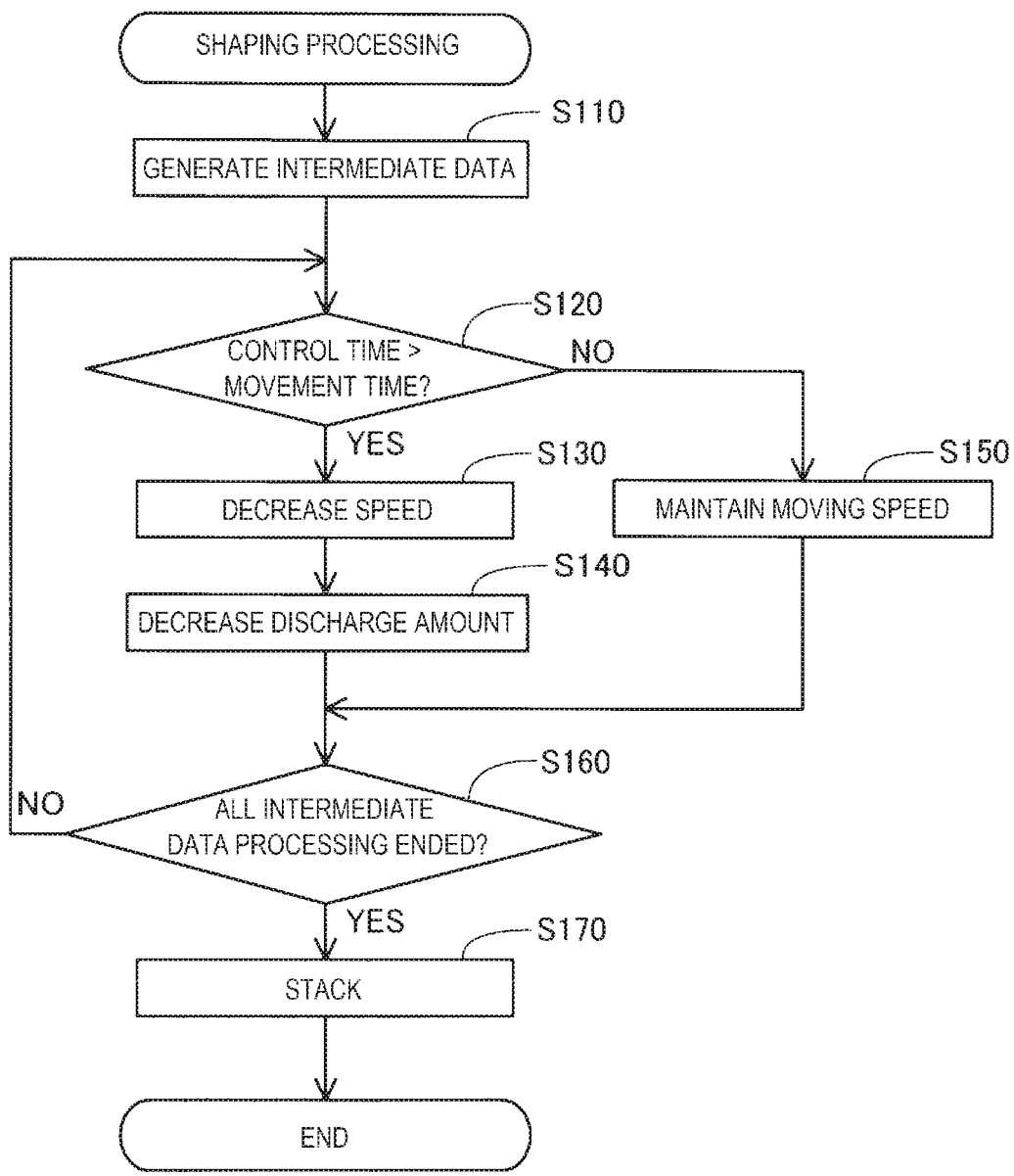
FIG. 4 is a process diagram showing a process of manufacturing a three-dimensional shaped article according to the first embodiment.

FIG. 4 is a process diagram showing a process of manufacturing the three-dimensional shaped article according to the present embodiment. The control unit 500 executes the shaping processing when a predetermined start operation is performed by a user on an operation panel provided in the three-dimensional shaping device 100 or a computer coupled to the three-dimensional shaping device 100. Manufacturing of the three-dimensional shaped article by the three-dimensional shaping device 100 is started by executing the shaping processing. In the shaping processing, the control unit 500 shapes a three-dimensional shaped article by appropriately controlling the shaping unit 200 and the moving mechanism 400 and stacking the shaping material on the shaping surface 311.

In an intermediate data generating step of step S110, the control unit 500 generates intermediate data. The intermediate data is data for shaping one layer of a shaped article, and is data including a partial route and a moving speed of the discharge unit 60. The partial route is a route along which the discharge unit 60 moves while continuously discharging the shaping material. The moving speed is a speed at which the discharge unit 60 moves along the partial route. Step S110 may be referred to as a first step.

In the present embodiment, the control unit 500 generates the intermediate data by reading shape data representing a shape of the three-dimensional shaped article created by using three-dimensional CAD software or three-dimensional CG software, and dividing the shape of the three-dimensional shaped article into layers each having a predetermined thickness. For example, data in an STL format or AMF format is used as the shape data. Shaping data created by slicer software is represented by a G code, an M code, or the like. The control unit 500 acquires the shaping data from a computer coupled to the three-dimensional shaping device 100 or a recording medium such as a USB memory. When a data processing device separate from the control unit 500 is provided, the data processing device may generate the above-described intermediate data.

Figure 5:
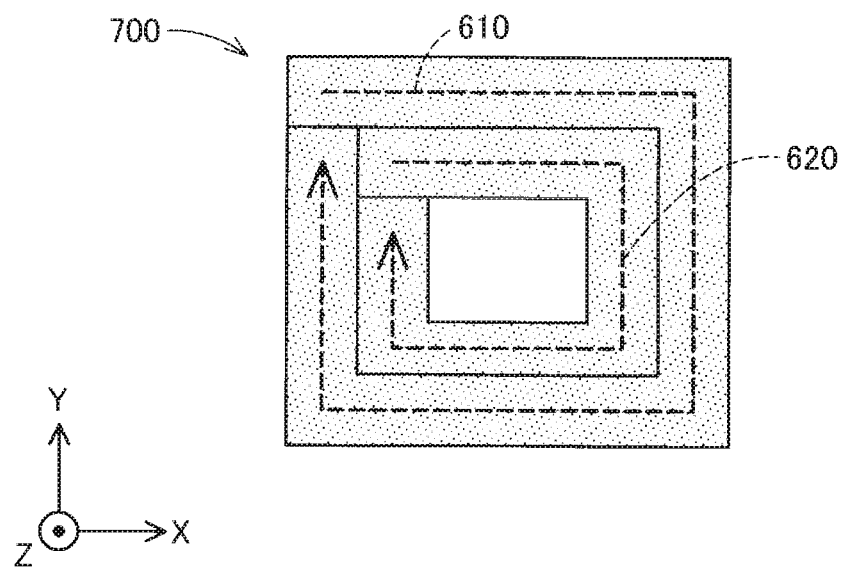
FIG. 5 is an explanatory diagram showing a route in shaping processing.

FIG. 5 is an explanatory diagram showing a route in the shaping processing according to the present embodiment. FIG. 5 shows a temporary shaped article 700 that is shaped when the shaping material is discharged from the discharge unit 60 according to intermediate data including a first partial route 610 and a second partial route 620. In the present embodiment, the control unit 500 generates the intermediate data including two partial routes, i.e., the first partial route 610 and the second partial route 620. In the present embodiment, the second partial route 620 is a route shorter than the first partial route 610. In step S110, the control unit 500 may create intermediate data including only one partial route, or may create intermediate data including three or more partial routes.

In step S120, the control unit 500 determines whether a control time is longer than a moving time by comparing the control time with the moving time. The control time is a time required to control the discharge amount adjustment mechanism 70 on the partial route. The moving time refers to a time required for the discharge unit 60 to move along the partial route.

In the present embodiment, the control time includes a discharge start time including a time for starting an operation of the discharge amount adjustment mechanism 70 at the discharge start, a discharge stop time including a time for stopping the operation of the discharge amount adjustment mechanism at the discharge stop, and an operation-uncontrollable time during which the discharge amount adjustment mechanism 70 cannot execute the discharge stop after the start operation. The start operation is an operation for starting the discharge of the shaping material from the discharge unit 60, and refers to an operation of opening the discharge amount adjustment mechanism 70 according to the present embodiment. The stop operation is an operation for stopping the discharge of the shaping material from the discharge unit 60, and refers to an operation of closing the discharge amount adjustment mechanism 70 according to the present embodiment.

In the present embodiment, the discharge start time is set as a time required to open the discharge amount adjustment mechanism 70 from an opening degree of 0 to an opening degree of 100 regardless of the opening degree of the valve body 72. The stop time is set as a time required to close the discharge amount adjustment mechanism 70 from an opening degree of 100 to an opening degree of 0 regardless of the opening degree of the valve body 72. In the present embodiment, the operation-uncontrollable time is a time during which the discharge amount adjustment mechanism 70 cannot receive a signal for executing the stop operation from the control unit 500 after the start operation, and therefore, the operation-uncontrollable time is constant regardless of the opening degree of the valve body 72. Therefore, in the present embodiment, the control time is constant regardless of the opening degree of the valve body 72.

Figure 6:
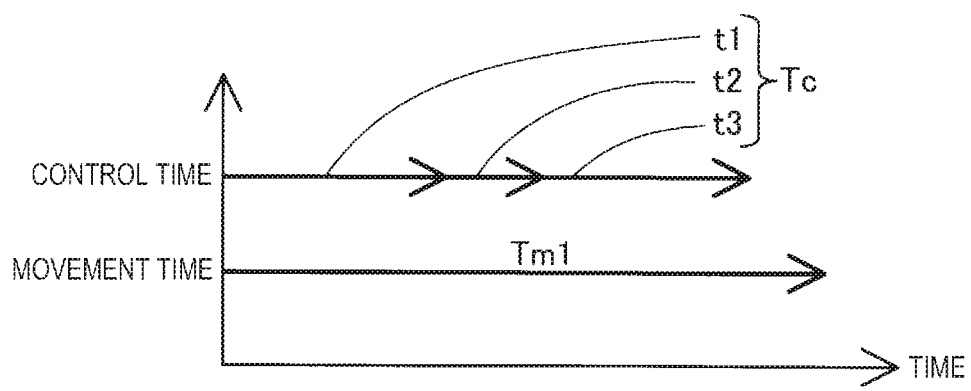
FIG. 6 is an explanatory diagram showing a relationship between a control time and a moving time on a first partial route.
Figure 7:
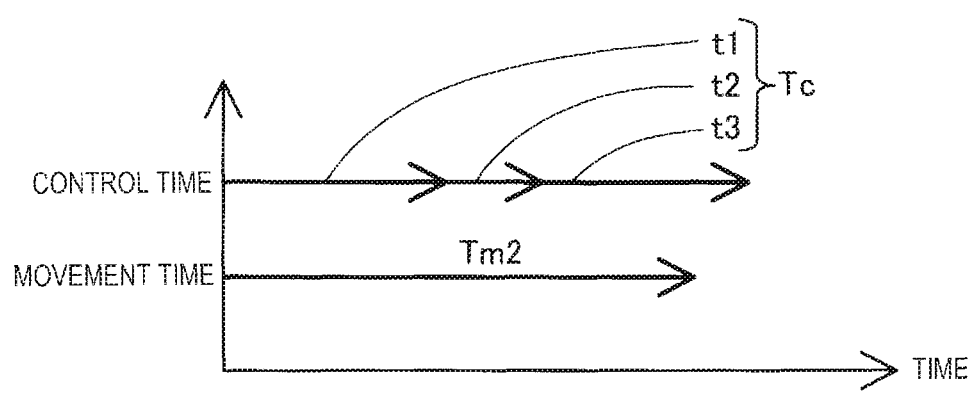
FIG. 7 is an explanatory diagram showing a relationship between a control time and a moving time on a second partial route.

FIG. 6 is an explanatory diagram showing a relationship between the control time and the moving time on the first partial route 610. FIG. 7 is an explanatory diagram showing a relationship between the control time and the moving time on the second partial route 620. Hereinafter, a step of step S120 will be described in detail with reference to FIGS. 6 and 7. In the shaping processing according to the present embodiment, the control unit 500 starts a movement of the discharge unit 60, and starts the start operation of the discharge amount adjustment mechanism 70 at the same time.

Referring to FIG. 6, on the first partial route 610 according to the present embodiment, a control time Tc is shorter than a moving time Tm1. The control time Tc is a sum of a discharge start time t1, an operation-uncontrollable time t2, and a discharge stop time t3. In this case, in step S120, the control unit 500 determines that the control time Tc is not longer than the moving time Tm1. Referring to FIG. 7, on the second partial route 620 according to the present embodiment, the control time Tc is longer than a moving time Tm2. In this case, in step S120, the control unit 500 determines that the control time Tc is longer than the moving time Tm2.

When it is determined in step S120 that the control time is longer than the moving time, in step S130, the control unit 500 decreases the moving speed to make the control time equal to or shorter than the moving time. In the present embodiment, in the case of changing the moving speed, the control unit 500 changes the moving speed from a start point to an end point of the partial route at a constant rate. Referring to FIG. 7, in the present embodiment, the control unit 500 sets the moving time Tm2 longer than the control time Tc by decreasing the moving speed from a start point to an end point of the second partial route 620 at a constant rate.

In step S140, the control unit 500 controls the discharge amount adjustment mechanism 70 to decrease a discharge amount in accordance with the moving speed decreased in step S130. Specifically, the control unit 500 performs control to decrease the opening degree of the discharge amount adjustment mechanism 70 in accordance with the moving speed decreased in step S130. More specifically, the discharge amount adjustment mechanism 70 is preferably controlled such that a deposition amount, which is an amount of the shaping material discharged per unit movement amount of the discharge unit 60, does not change before and after the moving speed is changed. A change in a line width of the shaping material discharged from the discharge unit 60 can be prevented by preventing the change in the deposition amount accompanying with the change in the moving speed.

When it is determined in step S120 that the control time is not longer than the moving time, the control unit 500 maintains an original moving speed without changing the moving speed in a stacking step of step S150.

The shaping data is generated based on the intermediate data by executing step S130 and step S140 or step S150 after the above-described step S120. A step of changing the moving speed to make the control time equal to or shorter than the moving time when it is determined in step S120 and step S130 that the control time is longer than the moving time is also referred to as a second step. In the present embodiment, step S140 and step S150 are also included in the second step.

In step S160, the control unit 500 determines whether all partial routes are processed. When not all the partial routes are processed, the processing returns to step S120 to process a next partial route. "Processing all partial routes" indicates that the comparison between the control time and the moving time shown in step S120 is executed for all the partial routes included in all intermediate data.

In step S170, the control unit 500 controls to discharge the shaping material from the discharge unit 60 toward the shaping surface 311 according to the shaping data, and to stack the discharged shaping material to complete the shaped article. Step S170 may be referred to as a third step.

According to the above-described three-dimensional shaped article manufacturing method according to the present embodiment, when the control time is longer than the moving time, the moving speed included in the intermediate data is changed to make the control time equal to or shorter than the moving time, and the shaping data is generated based on the intermediate data. Accordingly, the discharge amount adjustment mechanism 70 can start and stop the discharge of the shaping material from the discharge unit 60 from a start until a stop of the movement of the discharge unit 60 on the partial route. Therefore, the start and the stop of the discharge of the shaping material from the discharge unit 60 can be controlled with high accuracy, and shaping accuracy can be improved.

In the present embodiment, when the control time is equal to or shorter than the moving time in the second step, the moving speed included in the intermediate data is not changed. Therefore, the shaping accuracy can be improved by simple control.

In the present embodiment, in the second step, the amount of the shaping material discharged from the discharge unit 60 is changed in accordance with the changed moving speed. Accordingly, the change in the line width of the shaping material in a part where the moving speed is changed is prevented, and the shaping accuracy can be improved.

In the present embodiment, the start time, the stop time, and the operation-uncontrollable time are included. Therefore, the start and the stop of the discharge of the shaping material can be controlled with high accuracy, and shaping accuracy can be improved when there is a timing during which the control unit 500 cannot control the operation of the discharge amount adjustment mechanism 70 during shaping.

Here, a material of the three-dimensional shaped article used in the three-dimensional shaping device 100 described above will be described. In the three-dimensional shaping device 100, for example, a three-dimensional shaped article can be shaped using various materials such as a thermoplastic material, a metal material, or a ceramic material as a main material. Here, the "main material" means a material serving as a center forming the shape of the three-dimensional shaped article, and means a material that occupies a content rate of equal to or more than 50 wt % in the three-dimensional shaped article. The above-described shaping materials include those in which the main material is melted as a simple substance, or those obtained by melting a part of components contained together with the main material into a paste form.

When a thermoplastic material is used as the main material, the shaping material is generated by plasticizing the material in the melting unit 30.

For example, the following thermoplastic resin materials can be used as the thermoplastic material.

Examples of Thermoplastic Resin Material

General-purpose engineering plastics such as polypropylene resin (PP), polyethylene resin (PE), polyacetal resin (POM), polyvinyl chloride resin (PVC), polyamide resin (PA), acrylonitrile-butadiene-styrene resin (ABS), polylactic acid resin (PLA), polyphenylene sulfide resin (PPS), polyether ether ketone (PEEK), polycarbonate (PC), modified polyphenylene ether, polybutylene terephthalate, and polyethylene terephthalate; and engineering plastics such as polysulfone, polyethersulfone, polyphenylene sulfide, polyarylate, polyimide, polyamideimide, polyetherimide, and polyether ether ketone Additives such as a pigment, a metal, a ceramic, a wax, a flame retardant, an antioxidant, and a heat stabilizer may be mixed into the thermoplastic material. The thermoplastic material is converted to a plasticized and melted state by the rotation of the flat screw 40 and the heating of the heater 58 in the melting unit 30. The shaping material generated by the melting of the thermoplastic material is discharged from the nozzle 61, and then cured due to a decrease in temperature.

It is desirable that the thermoplastic material is emitted from the nozzle 61 in a state in which the material is heated to a temperature equal to or higher than the glass transition point thereof and in a completely melted state. For example, when an ABS resin is used, it is desirable that the temperature of the thermoplastic material is about 200° C. when discharged from the nozzle 61.

In the three-dimensional shaping device 100, for example, the following metal materials can be used as the main material instead of the above-described thermoplastic materials. In this case, it is desirable that a powder material in which the following metal material is formed into a powder form is mixed with a component to be melted when generating the shaping material, and the mixed material is supplied to the melting unit 30 as a material MR.

Examples of Metal Material

A single metal of magnesium (Mg), iron (Fe), cobalt (Co), chromium (Cr), aluminum (Al), titanium (Ti), copper (Cu), nickel (Ni), or an alloy containing one or more of these metals Examples of the Above-Described Alloy Maraging steel, stainless steel, cobalt chrome molybdenum, titanium alloy, nickel alloy, aluminum alloy, cobalt alloy, and cobalt chromium alloy In the three-dimensional shaping device 100, a ceramic material can be used as the main material instead of the above-described metal materials. For example, oxide ceramics such as silicon dioxide, titanium dioxide, aluminum oxide, and zirconium oxide, or non-oxide ceramics such as aluminum nitride can be used as the ceramic material. When the metal material or ceramic material as described above is used as the main material, the shaping material discharged onto the shaping surface 311 may be cured by sintering.

The powder material of the metal material or the ceramic material to be charged into the material supply unit 20 as the material MR may be a mixed material obtained by mixing a plurality of types of powder including a single metal, powder of an alloy, and powder of a ceramic material. The powder material of the metal material or the ceramic material may be coated with, for example, a thermoplastic resin as exemplified above, or a thermoplastic resin other than the above thermoplastic resin. In this case, the thermoplastic resin may be melted in the melting unit 30 to exhibit fluidity thereof.

For example, the following solvents can be added to the powder material of the metal material or the ceramic material to be charged into the material supply unit 20 as the material MR. The solvent can be used alone or in combination of two or more selected from the following.

Examples of Solvent

Water; (poly)alkylene glycol monoalkyl ethers such as ethylene glycol monomethyl ether, ethylene glycol monoethyl ether, propylene glycol monomethyl ether, and propylene glycol monoethyl ether; acetate esters such as ethyl acetate, n-propyl acetate, iso-propyl acetate, n-butyl acetate, and iso-butyl acetate; aromatic hydrocarbons such as benzene, toluene, and xylene; ketones such as methyl ethyl ketone, acetone, methyl isobutyl ketone, ethyl-n-butyl ketone, diisopropyl ketone, and acetylacetone; alcohols such as ethanol, propanol, and butanol; tetraalkylammonium acetates; sulfoxide-based solvents such as dimethyl sulfoxide and diethyl sulfoxide; pyridine-based solvents such as pyridine, γ-picoline, and 2,6-lutidine; tetraalkylammonium acetates (for example, tetrabutylammonium acetate); and ionic liquids such as butyl carbitol acetate In addition, for example, the following binders can be added to the powder material of the metal material or the ceramic material to be charged into the material supply unit 20 as the material MR.

Examples of Binder

Figure 8:
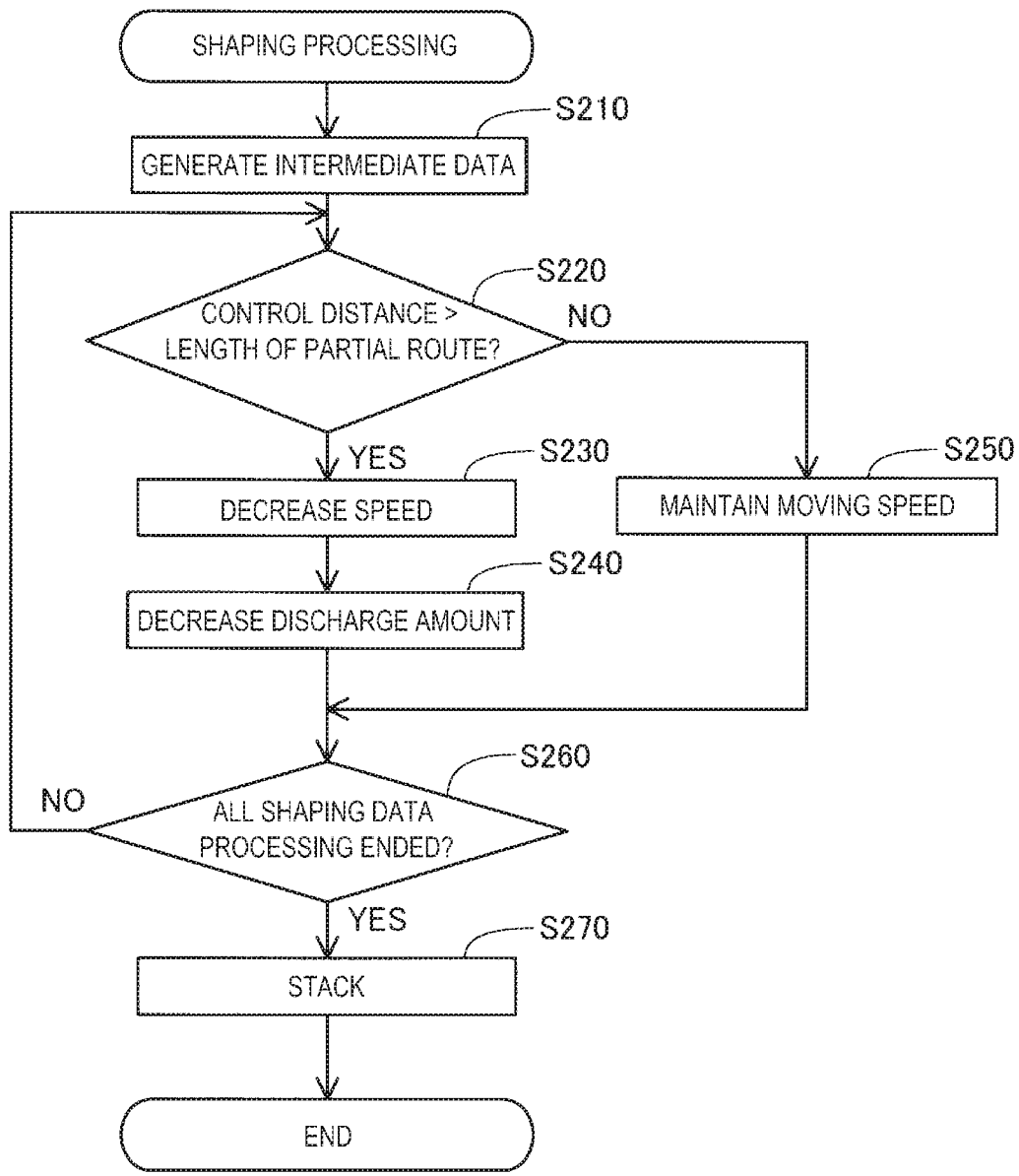
FIG. 8 is a process diagram showing a process of manufacturing a three-dimensional shaped article according to a second embodiment.

Acrylic resin, epoxy resin, silicone resin, cellulose-based resin; other synthetic resin; polylactic acid (PLA), polyamide (PA), polyphenylene sulfide (PPS), polyether ether ketone (PEEK); or other thermoplastic resins B. Second Embodiment FIG. 8 is a process diagram showing a process of manufacturing a three-dimensional shaped article according to the second embodiment. Since the configuration of the three-dimensional shaping device 100 according to the second embodiment is similar to that of the first embodiment, a description thereof will be omitted.

The second embodiment is different from the first embodiment in that, in step S220, a control distance and a length of the partial route are compared to determine whether the control distance is longer than the length of the partial route. The control distance is obtained as a distance that the discharge unit 60 is assumed to move during the control time required for the control unit 500 to control the discharge amount adjustment mechanism 70. The part not specifically described in the shaping processing according to the present embodiment is similar to that of the shaping processing in the first embodiment.

In the present embodiment, the control unit 500 obtains the control distance based on the control time required to control the discharge amount adjustment mechanism 70 and an average moving speed of the discharge unit 60. Specifically, the control unit 500 calculates the control distance by multiplying a total value of the control times by the average moving speed at which the discharge unit 60 moves on the entire route formed by the partial routes. Accordingly, a distance that the discharge unit 60 is assumed to move when the discharge unit 60 continues to move at the average moving speed during the control time is calculated as the control distance. In another embodiment, when the discharge start time, the discharge stop time, and the operation-uncontrollable time are included in the control time as in the first embodiment, the control unit 500 may calculate the control distance by summing values obtained by multiplying respective times by an average moving speed in the corresponding time. The average moving speed may be obtained based on, for example, an acceleration of the discharge unit 60, or may be obtained by dividing the length of the partial route by the moving time of the discharge unit 60.

Figure 9:
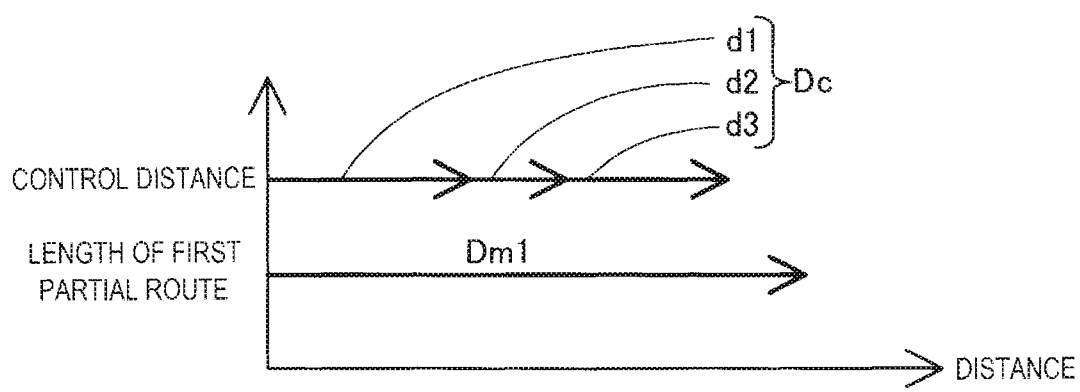
FIG. 9 is an explanatory diagram showing a relationship between a control distance and a length of the first partial route.
Figure 10:
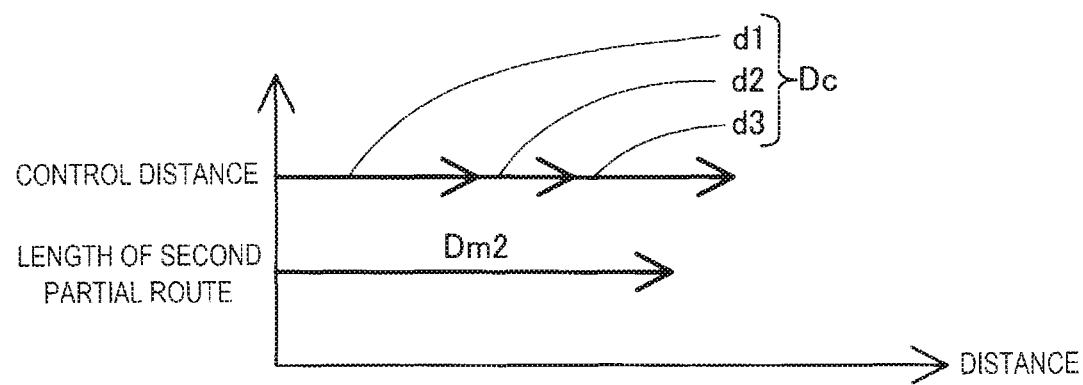
FIG. 10 is an explanatory diagram showing a relationship between the control distance and a length of the second partial route.

FIG. 9 is an explanatory diagram showing a relationship between a control distance Dc and a length Dm1 of the first partial route 610. FIG. 10 is an explanatory diagram showing a relationship between the control distance Dc and a length Dm2 of the second partial route 620. Hereinafter, a step of step S220 will be described in detail with reference to FIGS. 9 and 10.

Referring to FIG. 9, the control distance Dc is shorter than the length Dm1 of the first partial route 610. The control distance Dc is a sum of a discharge start distance d1, an operation-uncontrollable distance d2, and a discharge stop distance d3. In this case, in step S220, the control unit 500 determines that the control distance Dc is not longer than the length Dm1 of the first partial route 610. Referring to FIG. 10, the control distance Dc is longer than the length Dm2 of the second partial route 620. In this case, in step S220, the control unit 500 determines that the control distance Dc is longer than the length Dm2 of the second partial route 620. The discharge start distance d1, the operation-uncontrollable distance d2, and the discharge stop distance d3 are distances calculated based on the discharge start time, the operation-uncontrollable time, and the discharge stop time, respectively.

When it is determined in step S220 that the control distance is longer than the length of the partial route, in step S230 the control unit 500 decreases the moving speed to make the control distance equal to or shorter than the length of the partial route. Referring to FIG. 10, specifically, the control distance Dc is set to be equal to or shorter than the length Dm2 of the second partial route 620 by changing the moving speed to decrease the moving speed from the start point to the endpoint of the second partial route 620. By changing the moving speed to make the control distance Dc equal to or shorter than the length Dm2, the control unit 500 can complete the control of the discharge amount adjustment mechanism 70 while the discharge unit 60 is moving along the second partial route 620 in a step of actually stacking the shaping materials.

In step S260 of the present embodiment, the control unit 500 determines whether the comparison between the control distance and the length of the partial route shown in step S220 is executed for all the partial routes included in all intermediate data.

According to the above-described three-dimensional shaped article manufacturing method according to the second embodiment, the start and the stop of the discharge of the shaping material from the discharge unit 60 can be controlled with high accuracy, and the shaping accuracy can be improved. In particular, in the present embodiment, whether to change the moving speed can be determined by comparing the control distance with the length of the partial route instead of comparing the control time with the moving time.

In step S220, the control unit 500 may obtain the control distance by using the moving speed of the discharge unit 60 included in the intermediate data, instead of the average moving speed of the discharge unit 60. Specifically, the control unit 500 may obtain the control distance by multiplying the total value of the control times by a maximum value of the moving speed of the discharge unit 60 specified by the intermediate data. In such a configuration, the control unit 500 can also complete the control of the discharge amount adjustment mechanism 70 while the discharge unit 60 is moving along the second partial route 620 in the step of actually stacking the shaping materials.

C. Third Embodiment

Figure 11:
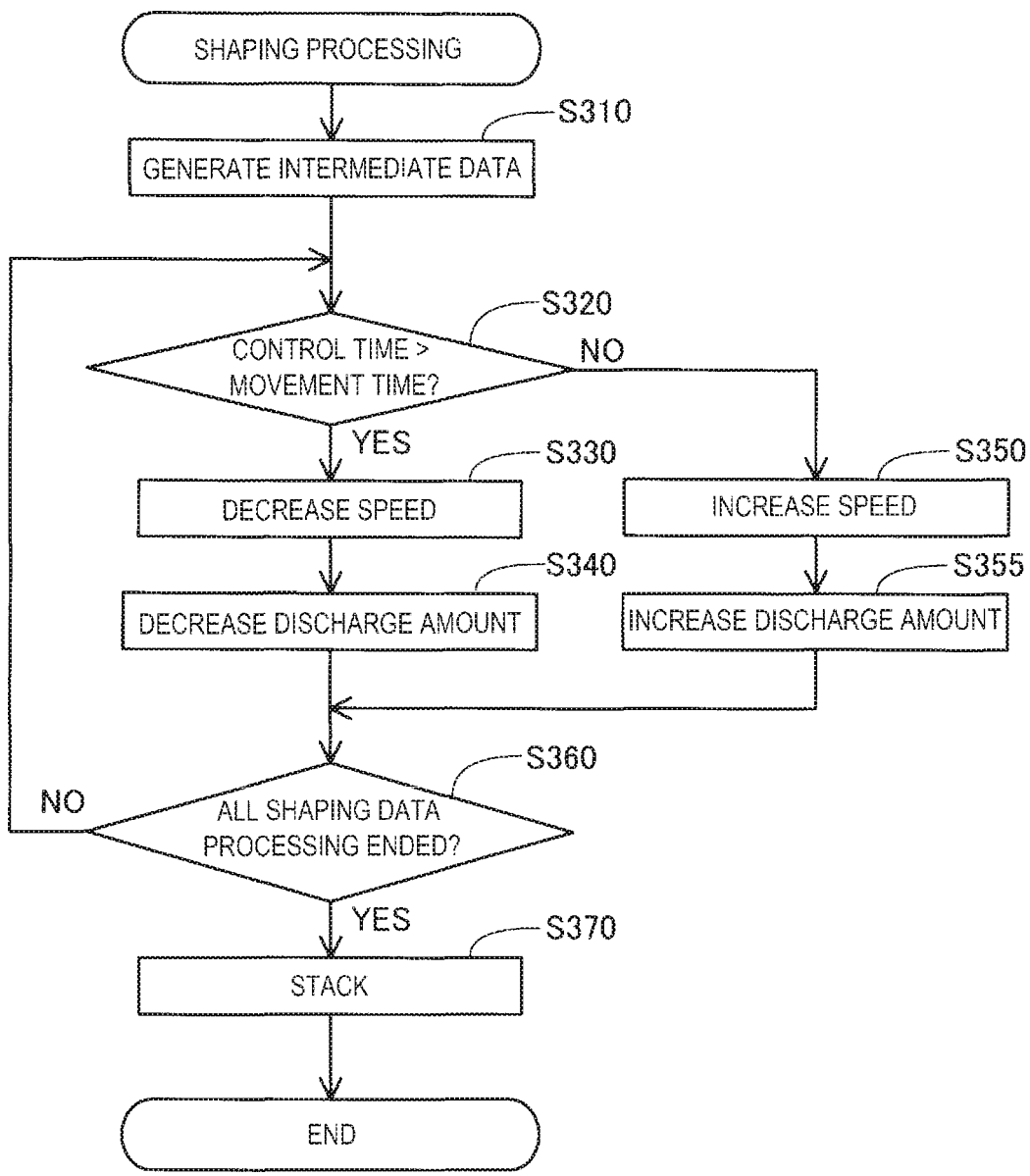
FIG. 11 is a process diagram showing a process of manufacturing a three-dimensional shaped article according to a third embodiment.

FIG. 11 is a process diagram showing a process of manufacturing a three-dimensional shaped article according to the third embodiment. Since the configuration of the three-dimensional shaping device 100 according to the third embodiment is similar to that of the first embodiment, a description thereof will be omitted.

In the shaping processing according to the third embodiment, processing when the control unit 500 determines in step S320 that the control time is not longer than the moving time is different from that of the shaping processing according to the first embodiment shown in FIG. 4. The part not specifically described in the shaping processing in the third embodiment is similar to that of the shaping processing in the first embodiment.

When it is determined in step S320 that the control time is not longer than the moving time, in step S350, the control unit 500 increases the moving speed to make the moving time shorter within a range in which the control time does not exceed the moving time. Referring to FIG. 6, specifically, the moving speed in the first partial route 610 is increased such that the moving time after the moving speed is increased is equal to or longer than the control time Tc and shorter than the moving time Tm1.

In step S355, the control unit 500 controls the discharge amount adjustment mechanism 70 to change the discharge amount in accordance with the moving speed changed in step S350. Specifically, the control unit 500 performs control to increase the opening degree of the discharge amount adjustment mechanism 70 in accordance with the moving speed increased in step S350. At this time, similar to step S140 in the shaping processing according to the first embodiment, the discharge amount adjustment mechanism 70 is preferably controlled such that the deposition amount does not change before and after the moving speed is changed.

According to the above-described three-dimensional shaped article manufacturing method according to the third embodiment, the start and the stop of the discharge of the shaping material from the discharge unit 60 can be controlled with high accuracy, and the shaping accuracy can be improved. In particular, in the present embodiment, when it is determined that the control time is not longer than the moving time, the control unit 500 changes the moving speed to make the moving time shorter within a range in which the control time does not exceed the moving time. Therefore, the start and the stop of the discharge of the shaping material from the discharge unit 60 can be controlled with high accuracy, and the shaped article can be shaped more quickly.

D. Fourth Embodiment

Figure 12:
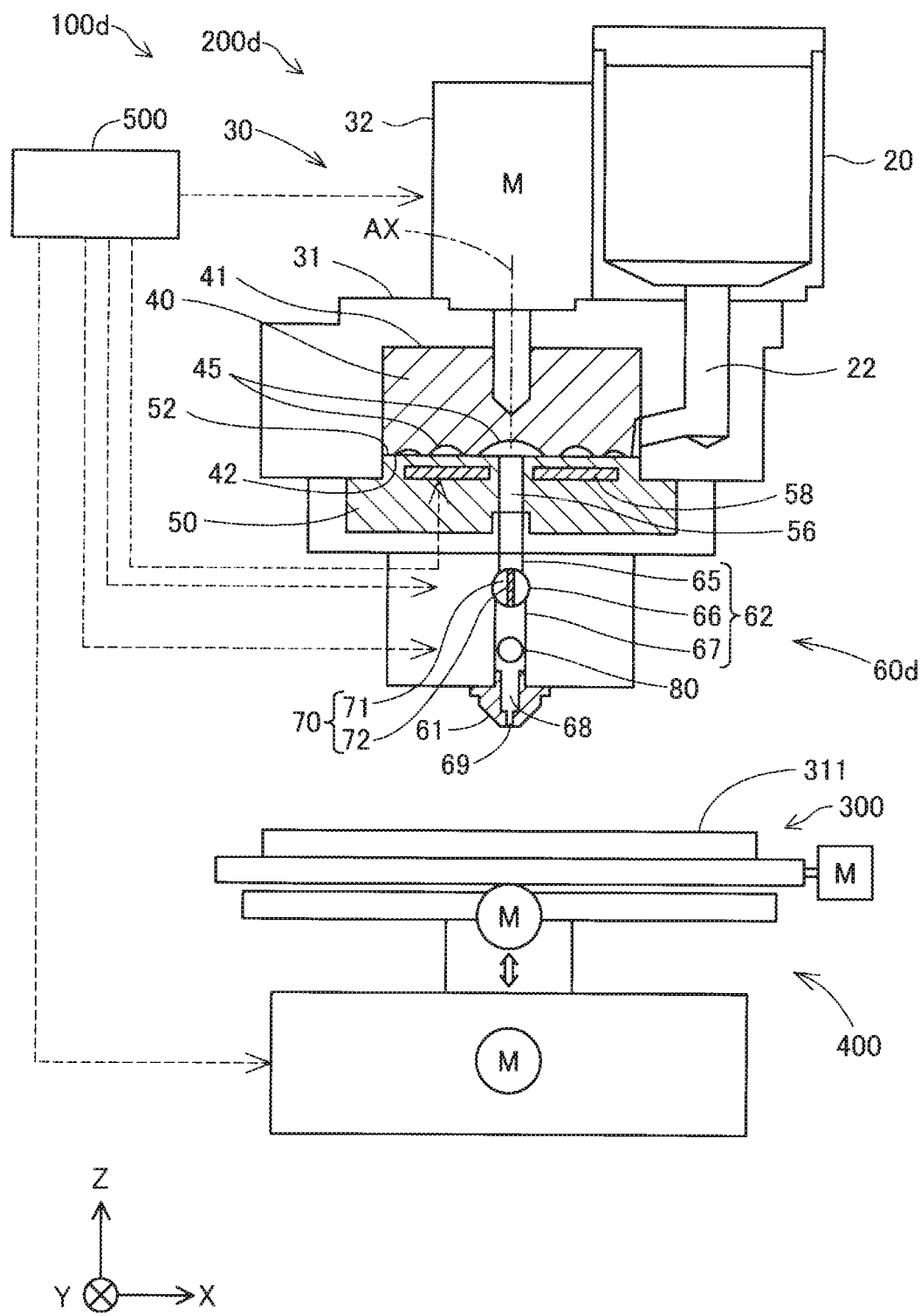
FIG. 12 is an explanatory diagram showing a schematic configuration of a three-dimensional shaping device according to a fourth embodiment.

FIG. 12 is an explanatory diagram showing a schematic configuration of a three-dimensional shaping device 100d according to the fourth embodiment. The configuration of a discharge unit 60d provided in a shaping unit 200d according to the present embodiment is different from that of the discharge unit 60 according to the first embodiment. The discharge unit 60 in the first embodiment includes the discharge amount adjustment mechanism 70 as the flow rate adjustment mechanism. On the other hand, the discharge unit 60d according to the present embodiment includes a suction mechanism 80 in addition to the discharge amount adjustment mechanism 70 as the flow rate adjustment mechanism. The points of the three-dimensional shaping device 100d not particularly described are similar to those of the three-dimensional shaping device 100 according to the first embodiment.

Figure 13:
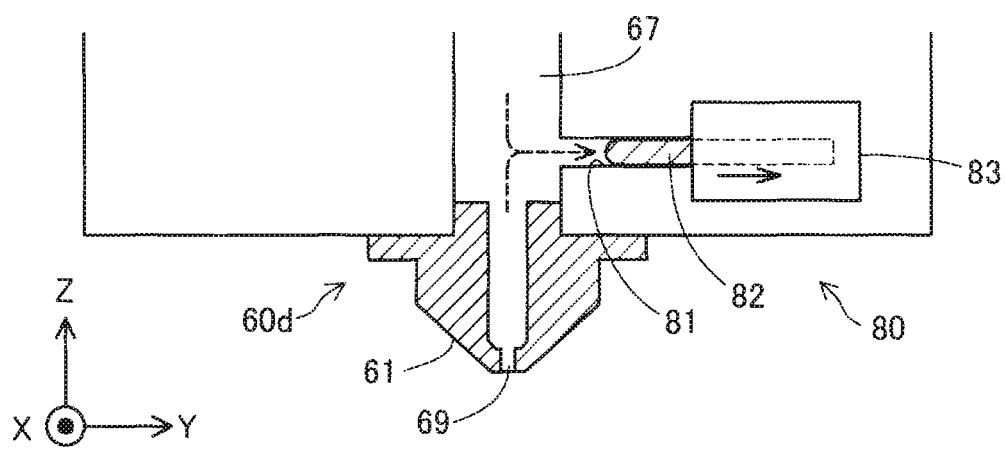
FIG. 13 is an explanatory diagram showing a schematic configuration of a suction mechanism.

FIG. 13 is an explanatory diagram showing a schematic configuration of the suction mechanism 80. The suction mechanism 80 includes a cylindrical cylinder 81 coupled to the second supply port 67, a plunger 82 accommodated in the cylinder 81, and a plunger drive unit 83 for driving the plunger 82. In the present embodiment, the plunger drive unit 83 includes a motor driven under the control of the control unit 500, and a rack and pinion for converting a rotation of the motor into a movement in a translational direction along an axial direction of the cylinder 81. The plunger drive unit 83 may include the motor driven under the control of the control unit 500, and a ball screw for converting the rotation of the motor into the movement in the translational direction along the axial direction of the cylinder 81, or may include an actuator such as a solenoid mechanism or a piezo element.

As indicated by an arrow in FIG. 13, when the plunger 82 moves in a +Y direction away from the second supply port 67, the shaping material from the second supply port 67 to the nozzle 61 is sucked into the cylinder 81 since an inside of the cylinder 81 has a negative pressure. On the other hand, when the plunger 82 moves in a −Y direction approaching the second supply port 67, the shaping material in the cylinder 81 is pushed out to the second supply port 67 by the plunger 82. Moving the plunger 82 in the direction away from the second supply port 67 may be referred to as pulling the plunger 82. Moving the plunger 82 in the direction approaching the second supply port 67 may be referred to as pushing the plunger 82.

In the present embodiment, when the discharge of the shaping material from the nozzle hole 69 is stopped, the shaping material discharged from the nozzle hole 69 is sucked toward the second supply port 67 by pulling the plunger 82, so that a tailing of the shaping material hanging like a thread pulled from the nozzle hole 69 can be prevented. The prevention of the tailing may be referred to as tail cutting. The control unit 500 controls the start and the stop of the discharge of the shaping material from the discharge unit 60d with high accuracy by controlling the discharge amount adjustment mechanism 70 and the suction mechanism 80. For example, the control unit 500 can control the discharge amount adjustment mechanism 70 to stop a flow of the shaping material flowing from the first supply port 65 to the second supply port 67, and can further control the suction mechanism 80 to perform tail cutting.

As described above, a three-dimensional shaped article can be shaped in a manner similar to the shaping step in the first embodiment shown in FIG. 4 even when the control unit 500 controls a plurality of flow rate adjustment mechanisms. For example, when an operation of pulling the plunger 82 is completed after the stop operation of the discharge amount adjustment mechanism 70, in step S120, the control unit 500 compares the moving time with the control time required from a start of the start operation of the discharge amount adjustment mechanism 70 to a completion of the operation of pulling the plunger 82.

According to the above-described three-dimensional shaped article manufacturing method according to the fourth embodiment, the start and the stop of the discharge of the shaping material from the discharge unit 60d can be controlled with high accuracy, and the shaping accuracy can be improved. In particular, in the present embodiment, the start and the stop of discharge of the shaping material from the discharge unit 60d can be controlled with high accuracy even when the control unit 500 controls a plurality of flow rate adjustment mechanisms.

E. Other Embodiments (E-1) In the above-described embodiments, when the moving speed included in the intermediate data is changed, the discharge amount is changed in accordance with the changed moving speed. In contrast, when the moving speed is changed, the discharge amount may not be changed.

(E-2) In the above-described embodiments, the start time and the stop time are constant regardless of a magnitude of the change in the opening degree of the discharge amount adjustment mechanism 70. In contrast, the start time and the stop time may be changed depending on the magnitude of the change in the opening degree of the discharge amount adjustment mechanism 70. At this time, when the discharge amount is changed in accordance with the change in the moving speed, the start time and the stop time may be calculated based on the opening degree of the discharge amount adjustment mechanism 70 in accordance with the changed discharge amount, and the control time may be compared with the moving time.

(E-3) In the above-described embodiments, the control time includes the start time, the stop time, and the operation-uncontrollable time. In contrast, for example, when there is no operation-uncontrollable time, the control time may not include the operation-uncontrollable time. For another example, when the movement of the discharge unit 60 is started during the start operation of the discharge amount adjustment mechanism 70, a time from a start of a movement of the discharge unit 60 along the partial route to a completion of the stop operation of the discharge amount adjustment mechanism 70 may be set as the control time. In this case, only a part of the start time is included in the control time.

(E-4) In the above-described embodiments, when the moving speed is changed, the control unit 500 changes the moving speed from the start point to the end point of the partial route at a constant rate. In contrast, the control unit 500 may not change the moving speed at a constant rate. At this time, when the discharge amount is changed in accordance with the change in the moving speed, the discharge amount adjustment mechanism 70 is preferably controlled such that the deposition amount does not change before and after the moving speed is changed.

(E-5) In the above-described embodiments, the discharge amount adjustment mechanism 70 is provided as the flow rate adjustment mechanism. In contrast, for example, only the suction mechanism 80 may be provided as the flow rate adjustment mechanism, and the discharge amount adjustment mechanism 70 may not be provided. Even in this case, the control unit 500 can control the start of the discharge by pushing the plunger 82 provided in the suction mechanism 80, and control the stop of the discharge by pulling the plunger 82. The control unit 500 can compare the moving time with a time required to control the suction mechanism 80.

F. Other Aspects

The present disclosure is not limited to the embodiments described above, and may be implemented by various aspects without departing from the scope of the present disclosure. For example, the present disclosure can be implemented in the following aspects. In order to solve some or all of problems of the present disclosure, or to achieve some or all of effects of the present disclosure, technical characteristics in the above-described embodiments corresponding to technical characteristics in aspects described below can be replaced or combined as appropriate. If the technical characteristics are not described as essential in the present description, they can be deleted as appropriate.

(1) According to a first aspect of the present disclosure, a three-dimensional shaped article manufacturing method is provided. The three-dimensional shaped article manufacturing method is a three-dimensional shaped article manufacturing method for manufacturing a three-dimensional shaped article by using a flow rate adjustment mechanism to control a discharge start and a discharge stop of a shaping material discharged from a discharge unit and stacking the shaping material, and includes: a first step of generating intermediate data including a partial route that is a route along which the discharge unit moves while continuously discharging the shaping material, and a moving speed of the discharge unit on the partial route; a second step of generating shaping data based on the intermediate data after the moving speed is changed to make a control time required to control the flow rate adjustment mechanism on the partial route equal to or shorter than a moving time for the discharge unit to move along the partial route when the control time is longer than the moving time; and a third step of controlling the discharge unit according to the shaping data and shaping the three-dimensional shaped article.

According to such an aspect, the discharge amount adjustment mechanism can start and stop the discharge of the shaping material from the discharge unit from a start until a stop of a movement of the discharge unit on the partial route. Therefore, the start and the stop of the discharge of the shaping material from the discharge unit can be controlled with high accuracy, and shaping accuracy can be improved.

(2) In the three-dimensional shaped article manufacturing method according to the above aspect, in the second step, the moving speed in the intermediate data may not be changed when the control time is equal to or shorter than the moving time. According to such an aspect, the shaping accuracy can be improved by simple control.

(3) In the three-dimensional shaped article manufacturing method according to the above aspect, in the second step, when the control time is shorter than the moving time, the moving speed may be changed to make the moving time shorter within a range in which the control time does not exceed the moving time. According to such an aspect, the start and the stop of the discharge of the shaping material from the discharge unit can be controlled with high accuracy, and a shaped article can be shaped more quickly.

(4) In the three-dimensional shaped article manufacturing method according to the above aspect, in the second step, an amount of the shaping material discharged from the discharge unit per unit time may be changed in accordance with the changed moving speed. According to such an aspect, the change in the line width of the shaping material in a part where the moving speed is changed is prevented, and the shaping accuracy can be improved.

(5) In the three-dimensional shaped article manufacturing method according to the above aspect, the control time may include a time required for a start operation of the flow rate adjustment mechanism during the discharge start, a time required for a stop operation of the flow rate adjustment mechanism during the discharge stop, and a time during which the flow rate adjustment mechanism cannot execute the discharge stop after the start operation. According to such an aspect, the start and the stop of the discharge of the shaping material can be controlled with high accuracy, and the shaping accuracy can be improved even when there is a timing during which the control unit cannot control the operation of the discharge amount adjustment mechanism during shaping.

(6) In the three-dimensional shaped article manufacturing method according to the above aspect, the flow rate adjustment mechanism may include at least one of a butterfly valve provided in a supply flow path through which the shaping material is supplied to the discharge unit, and a suction mechanism having a plunger configured to suck the shaping material in a cylinder coupled to the supply flow path. According to such an aspect, the start and the stop of the discharge of the shaping material can be controlled with high accuracy, and the shaping accuracy can be improved even when the butterfly valve or the suction mechanism is provided as the flow rate adjustment mechanism. The start and the stop of the discharge of the shaping material can be controlled with high accuracy even when a plurality of flow rate adjustment mechanisms are provided.

(7) According to a second aspect of the present disclosure, a three-dimensional shaped article manufacturing method is provided. The three-dimensional shaped article manufacturing method is a three-dimensional shaped article manufacturing method for manufacturing a three-dimensional shaped article by using a flow rate adjustment mechanism to control a discharge start and a discharge stop of a shaping material discharged from a discharge unit and stacking the shaping material, and includes: a first step of generating intermediate data including a partial route that is a route along which the discharge unit moves while continuously discharging the shaping material, and a moving speed of the discharge unit on the partial route; a second step of generating shaping data based on the intermediate data after the moving speed is changed to make a control distance, obtained as a distance that the discharge unit is assumed to move during a time required to control the flow rate adjustment mechanism, equal to or shorter than a length of the partial route when the control distance is longer than the length of the partial route; and a third step of controlling the discharge unit according to the shaping data and shaping the three-dimensional shaped article.

According to such an aspect, the discharge amount adjustment mechanism can start and stop the discharge of the shaping material from the discharge unit from a start until a stop of a movement of the discharge unit on the partial route. Therefore, the start and the stop of the discharge of the shaping material from the discharge unit can be controlled with high accuracy, and shaping accuracy can be improved.

The present disclosure is not limited to the above-described three-dimensional shaped article manufacturing method, and can be implemented in various aspects. For example, the present disclosure can be implemented in forms of a data processing device for processing data for shaping a three-dimensional shaped article, a three-dimensional shaping device, a method for controlling a three-dimensional shaping device, a computer program for shaping a three-dimensional shaped article, a non-transitory tangible recording medium for storing a computer program, and the like.

What is claimed is:

1. A three-dimensional shaped article manufacturing method for manufacturing a three-dimensional shaped article by using a flow rate adjustment mechanism to control a discharge start operation and a discharge stop operation of a shaping material discharged from a discharge unit which includes a nozzle, and by stacking the shaping material, the flow rate adjustment mechanism including a rotation valve provided in a supply flow path through which the shaping material is supplied to the discharge unit, the three-dimensional shaped article manufacturing method comprising:

generating intermediate data including a partial route that is a route along which the discharge unit moves while continuously discharging the shaping material without stopping the discharging of the shaping material from the discharge unit, and a moving speed of the discharge unit on the partial route;

generating shaping data based on the intermediate data, in the generating of the shaping data, determination of whether a control time required to control the flowrate adjustment mechanism on the partial route is longer than a moving time for the discharge unit to move along the partial route being performed, the control time including a sum of a time required for a start operation of the flow rate adjustment mechanism during the discharge start operation, a time required for a stop operation of the flow rate adjustment mechanism during the discharge stop operation, and a time during which the flow rate adjustment mechanism cannot execute the stop operation after the start operation;

in response to determination that the control time is longer than the moving time, the moving speed in the intermediate data being changed, to generate the shaping data, such that the control time is equal to or shorter than the moving time, and such that the moving speed from a start point to an end point of the partial route is changed at a constant rate, and in response to determination that the control time is not longer than the moving time, the moving speed in the intermediate data being maintained to generate the shaping data; and controlling the discharge unit according to the shaping data and shaping the three-dimensional shaped article, the flow rate adjustment mechanism adjusting a discharge amount of the shaping material from the nozzle by adjusting the opening degree of the rotation valve, the start operation being an operation of opening the rotation valve from the opening degree of 0 to the opening degree of 100, or an operation of opening the rotation valve from the opening degree of 0 to a predetermined opening degree, the stop operation including an operation of closing the rotation valve from the opening degree of 100 to the opening degree of 0, or an operation of closing the rotation valve from the predetermined opening degree to the opening degree of 0, when the discharge unit starts a movement along the partial route during the start operation, the control time being a time from a start time of the movement of the discharge unit to a completion time of the stop operation, and when the discharge unit starts the movement along the partial route at or before a start time of the start operation, the control time being a time from the start time of the start operation to the completion time of the stop operation.

2. The three-dimensional shaped article manufacturing method according to claim 1, wherein in the generating of the shaping data, the discharge amount of the shaping material discharged from the nozzle per unit time is further changed in accordance with the changed moving speed changed, in response to the determination that the control time is longer than the moving time in the determination of whether the control time is longer than the moving time.

3. The three-dimensional shaped article manufacturing method according to claim 1, wherein the rotation valve is a butterfly valve.

4. A three-dimensional shaped article manufacturing method for manufacturing a three-dimensional shaped article by using a flow rate adjustment mechanism to control a discharge start operation and a discharge stop operation of a shaping material discharged from a discharge unit which includes a nozzle, and by stacking the shaping material, the flow rate adjustment mechanism including a rotation valve provided in a supply flow path through which the shaping material is supplied to the discharge unit, the three-dimensional shaped article manufacturing method comprising:

generating intermediate data including a partial route that is a route along which the discharge unit moves while continuously discharging the shaping material without stopping the discharging of the shaping material from the discharge unit, and a moving speed of the discharge unit on the partial route;

generating shaping data based on the intermediate data, in the generating of the shaping data, determination of whether a control distance, obtained as a distance that the discharge unit is determined to move during a control time required to control the flow rate adjustment mechanism, is longer than a length of the partial route being performed, the control time including a sum of a time required for a start operation of the flow rate adjustment mechanism during the discharge start operation, a time required for a stop operation of the flow rate adjustment mechanism during the discharge stop operation, and a time during which the flow rate adjustment mechanism cannot execute the stop operation after the start operation;

in response to determination that the control distance is longer than the length of the partial route, the moving speed in the intermediate data being changed, to generate the shaping data, such that the control distance is equal to or shorter than the length of the partial route, and such that the moving speed from a start point to an end point of the partial route is changed at a constant rate, and in response to determination that the control distance is not longer than the length of the partial route, the moving speed in the intermediate data being maintained to generate the shaping data; and controlling the discharge unit according to the shaping data and shaping the three-dimensional shaped article, the flow rate adjustment mechanism adjusting a discharge amount of the shaping material from the nozzle by adjusting the opening degree of the rotation valve, the start operation being an operation of opening the rotation valve from the opening degree of 0 to the opening degree of 100, or an operation of opening the rotation valve from the opening degree of 0 to a predetermined opening degree, the stop operation including an operation of closing the rotation valve from the opening degree of 100 to the opening degree of 0, or an operation of closing the rotation valve from the predetermined opening degree to the opening degree of 0, when the discharge unit starts a movement along the partial route during the start operation, the control time being a time from a start time of the movement of the discharge unit to a completion time of the stop operation, and when the discharge unit starts the movement along the partial route at or before a start time of the start operation, the control time being a time from the start time of the start operation to the completion time of the stop operation.

5. A three-dimensional shaped article manufacturing system comprising:
a data processing device; and
a three-dimensional shaping device configured to shape a three-dimensional shaped article and including
a discharge unit which includes a nozzle, and
a flow rate adjustment mechanism including a rotation valve provided in a supply flow path through which a shaping material is supplied to the discharge unit, the data processing device being configured to process data for shaping the three-dimensional shaped article by using the flow rate adjustment mechanism to control a discharge start operation and a discharge stop operation of the shaping material discharged from the discharge unit the data processing device including at least one processor configured to perform
generating intermediate data including a partial route that is a route along which the discharge unit moves while continuously discharging the shaping material without stopping the discharging of the shaping material from the discharge unit, and a moving speed of the discharge unit on the partial route, and
generating shaping data based on the intermediate data,
to perform the generating of the shaping data, the at least one processor being configured to determine whether a control time required to control the flow rate adjustment mechanism on the partial route is longer than a moving time for the discharge unit to move along the partial route, the control time including a sum of a time required for a start operation of the flow rate adjustment mechanism during the discharge start operation, a time required for a stop operation of the flow rate adjustment mechanism during the discharge stop operation, and a time during which the flow rate adjustment mechanism cannot execute the stop operation after the start operation;

the at least one processor being configured to change the moving speed in the intermediate data such that the control time is equal to or shorter than the moving time, in response to determining that the control time is longer than the moving time, and such that the moving speed from a start point to an end point of the partial route is changed at a constant rate, and the at least one processor being configured to maintain the moving speed in the intermediate data in response to determining that the control time is not longer than the moving time, and the three-dimensional shaping device controlling the discharge unit according to the shaping data to shape the three-dimensional shaped article, the flow rate adjustment mechanism adjusting a discharge amount of the shaping material from the nozzle by adjusting the opening degree of the rotation valve, the start operation being an operation of opening the rotation valve from the opening degree of 0 to the opening degree of 100, or an operation of opening the rotation valve from the opening degree of 0 to a predetermined opening degree, the stop operation including an operation of closing the rotation valve from the opening degree of 100 to the opening degree of 0, or an operation of closing the rotation valve from the predetermined opening degree to the opening degree of 0, when the discharge unit starts a movement along the partial route during the start operation, the control time being a time from a start time of the movement of the discharge unit to a completion time of the stop operation, and when the discharge unit starts the movement along the partial route at or before a start time of the start operation, the control time being a time from the start time of the start operation to the completion time of the stop operation.

6. The three-dimensional shaped article manufacturing method according to claim 1, wherein
the flow rate adjustment mechanism further includes a suction mechanism having a plunger configured to suck the shaping material in a cylinder, the cylinder being coupled to the supply flow path at a downstream side relative to the rotation valve in a supply direction of the shaping material,
to stop discharging of the shaping material from the discharge unit,
the stop operation of the rotation valve and an operation of pulling of the plunger are performed, the pulling of the plunger is performed such that the shaping material is sucked in the cylinder, and
the operation of the pulling of the plunger is completed after the stop operation of the rotation valve.

7. The three-dimensional shaped article manufacturing method according to claim 6, wherein
the completion time of the stop operation is a completion time of the operation of the pulling of the plunger.

8. The three-dimensional shaped article manufacturing system according to claim 5, wherein
the at least one processor is further configured to read shape data representing a shape of the three-dimensional shaped article, and divide the shape of the three-dimensional shaped article into layers each having a predetermined thickness, and
the at least one processor generates the intermediate data for each of the layers.

9. The three-dimensional shaped article manufacturing method according to claim 1, wherein
the time during which the flow rate adjustment mechanism cannot execute the stop operation after the start operation is an operation-uncontrollable time during which a signal for executing the stop operation from at least one processor is not receivable at the flow rate adjustment mechanism after the start operation.

* * * * *